United States Patent
Miller

[15] 3,677,377
[45] July 18, 1972

[54] SELF-ADJUSTING ELECTROMAGNETIC CLUTCH-BRAKE

[72] Inventor: Donald L. Miller, Horseheads, N.Y.

[73] Assignee: The Bendix Corporation

[22] Filed: March 31, 1971

[21] Appl. No.: 129,743

[52] U.S. Cl. .............................. 192/18 B, 192/35, 192/84 A, 192/116 A, 188/71.8
[51] Int. Cl. ......................................................... F16d 67/02
[58] Field of Search ................ 192/84 R, 84 A, 111 A, 111 B, 192/54, 18 B, 35; 188/71.8

[56] References Cited

UNITED STATES PATENTS

| | | | |
|---|---|---|---|
| 2,481,028 | 9/1949 | Lear | 192/18 B |
| 2,692,035 | 10/1954 | Rabinow | 192/84 R |
| 2,966,977 | 1/1961 | Johnson | 192/84 A |
| 3,168,175 | 2/1965 | Straube et al. | 192/111 A |
| 3,214,084 | 10/1965 | Smirl | 192/111 A |
| 3,438,471 | 4/1969 | Wrensch | 192/18 B |

*Primary Examiner*—Allen D. Herrmann
*Assistant Examiner*—Randall Heald
*Attorney*—Bruce A. Yungman and Plante, Hartz, Smith & Thompson

[57] ABSTRACT

An electromagnetic clutch-brake with wear compensating means having mating frusto-conical friction members for transmitting torque and a ferromagnetic armature threaded to one of such friction members for clutch engagement. When the clutch is energized, the armature, which is not in the drive train, comes into contact with the pole faces of the electromagnet, causing the freely mounted armature to rotate with the input member. The relative rotational motion between the armature and the driven friction member causes the driven friction member to advance on its helical thread until engagement with the driving friction member. The output member is driven through a flexible member connected to the driven friction member. As a safety feature, the driven friction member biased by the flexible torque transmitting member is caused to bear against a stationary braking body to achieve braking whenever the driven friction member is not in torque transmitting contact with the input member.

6 Claims, 1 Drawing Figure

Patented July 18, 1972
3,677,377
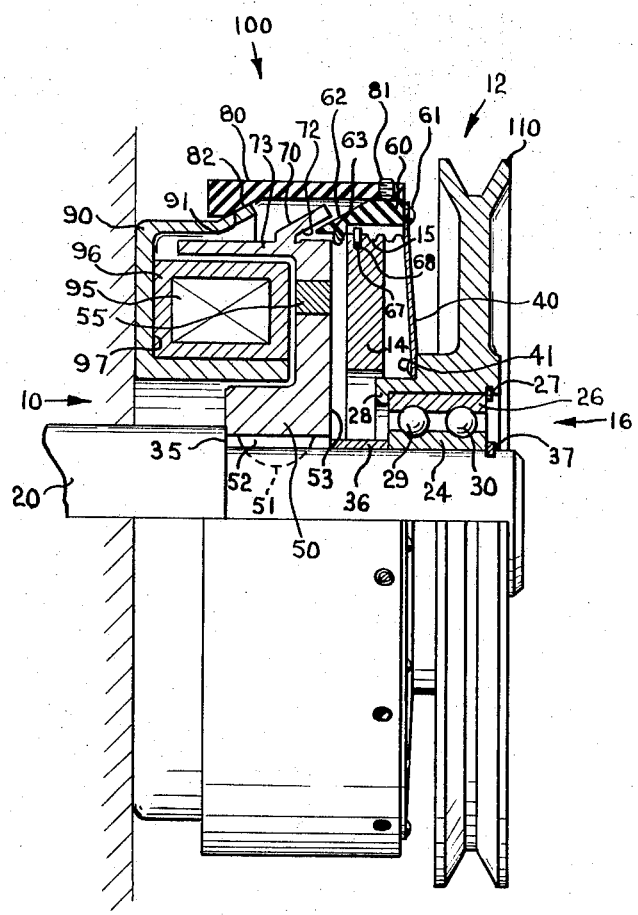
DONALD L. MILLER
INVENTOR.
BY Bruce A. Yungman

SELF-ADJUSTING ELECTROMAGNETIC CLUTCH-BRAKE

BACKGROUND OF THE INVENTION

This invention relates to electrically operated friction devices and controls therefor and more particularly to an electromagnetic self-adjusting cone clutch-brake.

BRIEF DESCRIPTION OF THE PRIOR ART

As the popularity of garden-type tractors has increased, it has become increasingly more important to expand their utility without adversely affecting their cost. Since these tractors usually have power take-off to accomplish garden chores, cut grass, and remove snow from sidewalks and driveways, an effective clutching arrangement whereby sufficient torque is transmitted to accomplish these tasks has become very important. Heretofore, manually set power take-offs have sufficed, but the need is becoming apparent for clutching means which are more reliable from a safety viewpoint. Electromagnetic clutches are generally recognized as having many of the attributes necessary for garden tractor clutches; however, the torque transmitting capabilities are limited in proportion to the physical size of the clutch. It is, therefore, an object of this invention to provide an electromagnetic clutch having high torque transmitting capabilities and small size.

Since garden tractors would be used in association with cutting accessories, it is necessary to provide an accessory drive brake which rapidly and efficiently brakes any accessories when their driving relation is terminated. It is, therefore, a further object of this invention to provide an automatic braking action for the electromagnetic clutch having the above described features.

Heretofore, there has existed at least two recognizable types of electromagnetic clutch constructions, one herein called the "cone" variation and the other herein called the "disc" variation. In the cone type, interengaging surfaces for friction working faces between engageable rotatable clutch elements are conically shaped and by their inherent geometrical configuration require less axial force to develop sufficient frictional locking of the working faces for conjoint rotation. In the disc type, the engaging surfaces for frictional working faces are generally disposed normally to the access to the engageable rotatable clutch elements, and in instances where the flux linkages pass through the working faces, the armature pull is entirely axial. The disc construction is particularly advantageous due to the facility it provides for large axially directed flux linkages and thereby providing for a stronger clutch engaging force.

Other prior art designs are known which allegedly combine the desirable characteristics of the two known types of electromagnetic type constructions mentioned above, but such designs usually had several disadvantages. Some of the prior art designs required the flux path to pass through the torque transmitting cone member. This meant that the cone member had to be manufactured from a magnetic conducting material. This design also meant that the outer magnetic pole force would be almost radial instead of in the preferred axial direction. Other prior art designs showed a cone pole piece threaded to the disc link pole piece, however, with this design the flux was required to pass through the thread thereby meaning an even greater loss in flux. Further, in all these prior art designs as wear occurs between the principal torque transmitting surfaces, a substantial reluctance is created, regardless of any self-adjusting wear compensating feature.

SUMMARY OF THE PRESENT INVENTION

This invention is an electromagnetic clutch-brake apparatus for torque transmission having input means, output means, clutch actuating means including an electromagnetic winding, an armature rotatably connected to the output means and operative to contactively engage with said input means in response to the actuating means, a cone shaped torque transmitting friction member threaded to the armature and allowed to advance on said armature for driving the output means, a resilient braking member fixedly interconnecting the torque transmitting member and the output means, and a friction brake member connected to the torque transmitting member for automatically applying braking action to the output means whenever the clutch is de-energized.

It is, therefore, an object of this invention to provide an improved self-adjusting electromagnetic friction device which uniquely combines the desirable features of both the disc and cone type electromagnetic friction devices. A particular feature of this invention, pursuant to this object, is the provision of a ferro-magnetic flat disc-like armature disposed normally to the clutch axis, and a cone-like organic friction member for torque transmission threadably connected and engageably responsive to said armature.

Another object of this invention is the provision of a more durable and economical electromagnetic friction device. Of particular concern is the ability to incorporate a cone type clutch with its high torque capabilities with a disc type armature having high magnetic force characteristics.

It is another object of this invention to increase the torque of a single surface clutch by 100 percent while simultaneously maintaining the favorable engaging characteristics of a disc type clutch.

It is still a further object of this invention to provide an electromagnetic clutch-brake mechanism which minimizes the reluctance in the flux path linkage by providing an armature which is not the principal torque carrying member and which is not in the drive train. That is, the flat smooth contactive relationship between the armature and the electromagnet's pole faces is maintained throughout the life of the clutch. Thus, a strong magnetic engaging force is guaranteed regardless of the wear exhibited by the driving friction member which is the principal torque transmitting member.

Another object of this invention is to provide an electromagnetic clutch-brake in which the electromagnetic engaging force is unaffected by wearing of the torque carrying members since the flux does not pass through the torque transmitting surfaces.

Yet another object of this invention is to provide an electromagnetic clutch-brake in which many different friction and/or organic materials may be used for the principal torque transmitting members so that clutch torque, clutch life, and operational noise may be optimized.

It is still a further object to provide an electromagnetic clutch-brake of the cone type, wherein the engaging magnetic flux path remains axial.

Still another object of this invention is the provision of a unique and simplified wear adjusting means to automatically maintain the clutch armature in close contactive engagement with the electromagnet's pole face, regardless of the wear experienced by the torque transmitting friction members.

It is another object of this invention to provide an efficient electromagnetic clutch-brake with a new and economical wear compensating means.

It is even a further object of this invention to provide an electromagnetic clutch-brake having high torque load capacity in a clutch housing of substantially smaller diameter.

It is still a further object of the present invention to provide a self-adjusting electromagnetic clutch which includes a new and novel braking means which is operatively integral with the self-adjusting wear compensating feature.

Other objects and advantages of this invention will become apparent from the following detailed description taken in conjunction with the accompanying drawing.

BRIEF SUMMARY OF THE DRAWING

The drawing shows, in a single FIGURE view, partially in section, the presently preferred embodiment of my invention in the disengaged position.

DETAILED DESCRIPTION OF THE PREFERRED EMBODIMENT

Referring now to the drawing, there is shown an electromagnetic friction device 100 adapted to transmit rotative power and operate a pulley 110 of the type used in garden-type tractors. Of course, the output means could comprise a shaft or some other device different from pulley 110.

The electromagnetic friction device 100 comprises generally rotatable driving or input means 10, and generally rotatable driven or output means 12 which is shiftable axially into friction engagement with the input means 10. The output element, pulley 110, is rotatively mounted by a bearing means 16 upon the input shaft 20, the bearing means 16 being disposed between shaft 20 and the output element pulley 110. The bearing means 16 comprises inner and outer races 24 and 26. Outer race 26 is secured against axial movement by cooperation of a snap ring 27 and shoulder 28 provided on the inner surface of pulley 110. A plurality of ball bearings 29 received within annular grooves 30 provided in the internal surfaces of the races 24 and 26, maintain the pulley 110 in proper alignment with the input shaft 20 and allow the output element, pulley 110, to rotate thereon.

The clutch driven or output means 12 is essentially comprised of five parts. The first part is pulley 110 described above. The second part, resilient member 40, is secured to the pulley 110 by a plurality of bolts 41. Resilient member 40 has three principal functions. It serves as the armature return spring, as the braking spring member, and as the member which transmits torque from the input to the pulley 110. Member 40 may be a "three-finger spring", a flexible steel diaphragm or any other resilient member that will have the characteristics to efficiently perform the three functions mentioned above.

The third essential part is an annular friction ring 60 which is connected to flexible member 40 by any suitable means, such as a plurality of screws 61. The radially outer surface of member 60 has a frustro-conical face 62 adapted to frictionally engage with mating frustro-conical face 72 of section 70 of the driving means 10. The cylindrical internal surface 63 of friction member 60 is threaded entirely therealong. Since the torque transmitting member 60 is not in the flux path, it may be manufactured from a wide selection of magnetically nonconductive friction materials. In the preferred embodiment of this invention, member 60 is fabricated from an organic friction material; thus, clutch torque, clutch life, and operational noise are optimized to an extent never before possible, even with clutches of similar design.

The fourth part of the driven means 12 is the annular armature ring element 14 having a radially outer surface 15 threadably received within the inner threaded surface 63 of friction member 60. An annular groove 67 is provided in the outer surface 15 of armature 14 for receiving an annular drag ring 68 which is adapted to maintain friction member 60 in a relatively axial and rotational fixed position relative to armature ring 14 when no appreciable turning force is applied to armature 14. Drag ring 68 has a radially extending portion 69 which fits into an axial slot 64 provided in the inner diameter of member 60. The helically threaded connection between friction member 60 and armature 14 along with the retarding effect of drag ring 68 comprises the self-adjusting wear compensating feature of this invention. It should be noted that the drag ring 68 could also be located external of the armature ring 14 and furnish the same retarding effect upon relative motion between friction member 60 and armature ring 14 without affecting the self-adjusting feature of the invention. Armature 14 is shown in a disengaged mode with the friction member 60 being fully withdrawn. The relative "play" in the thread between surfaces 15 and 63 may be controlled by a thread tightening set screw or equivalent device.

Axially spaced from the torque transmitting member 60 on the side thereof in opposition to the output member 110 is the stationary housing structure, indicated generally by 90, which includes a frustro-conical surface 91 thus forming part of the braking means. The fifth part of the output means 12 is an annular braking member 80 which is fastened to the torque transmitting member 60 by a plurality of screws 81 thus forming the remainder of the braking means. Braking member 80 has a frustro-conical surface 82 formed on its inner diameter which is adapted to contactively engage with frustro-conical surface 91 of the stationary frame member 90. Braking member 80 is biased into intimate contact with stationary member 90 by the flexible torque transmitting member 40. By this construction, pulley 110 is braked under the influence of member 40 and brake member 80 at all times, except when the clutch is in the engage or torque transmitting mode.

Braking member 80 is preferably fabricated from an organic friction material (as shown) in order to meet optimum braking and noise requirements. In addition, the use of a conically shaped braking member results in several favorable design advantages. First, the highly efficient conical braking surfaces do not require as strong a braking force as would normally be required; thus, the resilient braking force required by resilient member 40 is greatly reduced. Secondly, since the braking force required by resilient member 40 is reduced, a lighter, more economical spring material may be used. Thirdly, since the braking force exerted by member 40 is less, the required magnetic engaging force necessary to overcome the braking force (when the clutch is energized) is also substantially reduced.

The clutch actuating means comprise a flux conducting body means and an electromagnetic winding 95. The electromagnetic winding or coil means 95 is disposed within cavity 97 of the stationary frame 90 and is contained therein by epoxy 96 or other suitable adhesive. The coil 95 may be manufactured from copper wiring, aluminum foil, or the like, and is suitably connected to a d.c. power source and an electrical control means (not shown). The flux conducting body means of the clutch actuating means is also part of the driving means 10 and is described below.

The driving or input means 10 is comprised of three concentric annular elements which form one integral rotatable body. In order to establish two separate flux conducting surfaces, the radially inner member 50 of the driving means 10 is separated from the radially outer member 73 of the driving means 10 by a nonconductive ring 55. Ring 55 is integrally secured to member 50 and to member 73 by any suitable means, such as brazing. This particular feature of electromagnetic clutches, that is, establishing two poles, is well known in the art. Ring 55 may be manufactured from various nonmagnetic materials such as stainless steel, brass, etc.

Inner member 50 of driving means 10 is secured to input shaft 20 for rotation therewith by means of a key-way slot 51 and a key 52 disposed therein. In order to prevent axial movement of the clutch assembly, and to insure axial alignment of the driving and driven means, a spacer ring 36 (which may be fabricated from brass, for example) is disposed between inner member 50 and inner race 24; a shoulder 35 provided on shaft 20 abuts inner member 50 on the left side (in the drawing), and a snap ring 37 which is sprung into a groove in shaft 20 abuts inner race 24 on the right side (in the drawing). Member 50 has a pole face 53 which is normal to the axis of the clutch and parallel to armature 14. Member 73, the outer member of driving means 10, has a pole face 75 also disposed normal to the clutch axis and parallel to armature 14. Member 73 has a frustro-conical section 70 cut therein for receiving the principal torque transmitting member 60. Frustro-conical surface 72 of section 70 is tapered radially inwardly toward the interior of the friction device 100. Member 70 is the principal torque transferring member of the input or driving means 10. Although member 70 is shown as being integral with member 73, it is possible to form the annular section 70 from a nonmagnetic conducting material and mount it to member 73, or to fasten a friction member to the frustro-conical face 72 of member 70.

OPERATION

In operation, the armature ring element 14 is moved axially into engagement with the pole faces 53 and 75 of the driving means 10 upon energization of the electromagnetic winding 95. The magnetic engaging forces exerted on armature 14 are completely axial and, therefore, provide a close contact between the pole faces and the armature 14. At this time, friction member 60 remains axially spaced apart from section 70 of the input or driving means 10, however, braking member 80 is now moved away from the braking surface 91 of the stationary member 90 so that the friction member 60 and therefore the pulley 110 are free to rotate. Armature 14 begins to rotate with the driving means 10 which causes the nonrotating friction member 60 to screw inwardly of the device thereby advancing frustro-conical surface 62 into contactive engagement with frustro-conical surface 72 of the input means 10. Armature 14 remains in close contactive engagement with the pole faces 53 and 75 of the driving means 10 and no air gap between these members is allowed to develop, while simultaneously almost all torque transfer between the driving means and the driven means is being carried by the frustro-conical or cone-like surfaces 62 and 72. The resilient diaphragm or torque transmitting member 40 provides a direct mechanical link between the driven friction member 60 and the pulley 110 and thus provides rotative power to the pulley 110.

Whenever the electromagnetic winding 95 is de-energized, the entire driven means 12 which includes the pulley 110, the friction member 60, and armature 14 are brought to a state of rest by the reaction of the braking surface 82 of the braking member 80 against the braking surface 91 of the stationary member 90. Thus, the accessory driven by pulley 110 is caused to stop its operation. The braking force is directly related to the resilient force exerted by flexible member 40. When the electromagnet is again energized, its action upon the armature 14 will instantly draw the cone clutch member 60 into operative position to be rotated by the cone receiving surface 72 of the driving means 10. No further rotative movement of friction member 60 upon the screw threaded surface of armature 14 will take place until the frictional surfaces 62 and 72 become worn. This simultaneous engagement of armature 14 with the pole faces 53 and 75 of the driving means 110 and the engagement of friction member 60 with the driving surface 72 of driving means 10 is a result of the retarding effect caused by drag ring 68; that is, drag ring 68 will only permit friction member 60 to rotate in one direction relative to armature 14, that direction being the direction of rotation of the driving means 10. Any loss motion occasioned by the wearing away of the frictional surfaces 62 and 72 will at once be taken up by the rotation of the friction ring 60 upon the screw threaded outer surface 15 of armature 14. The screw threaded connection between armature 14 and friction member 60 automatically adjusts the position of member 60 to take up any wear that may occur.

A more detailed description of drag ring 68 and its operative cooperation with the armature and the friction member can be found in commonly assigned pending application U. S. Ser. No. 129,740 filed on even date.

While only one embodiment of the invention has been disclosed, it will be apparent to those skilled in the art that changes may be made to the invention as set forth in the appended claims, and, in some cases certain features of the invention may be used to advantage without corresponding use of other features. Accordingly, it is intended that the illustrative and descriptive materials herein be used to illustrate the principles of the invention and not to limit the scope thereof.

I claim:

1. An electromagnetic friction device for torque transmission comprising:
   input means;
   output means;
   torque transmitting means for transferring torque from said input means to said output means, said torque transmitting means including a cone shaped friction ring member, said member having a helical thread along its inner diameter;
   an annular ferro-magnetic armature, said armature being threadably received in the helical thread of said cone member for relative rotation therewith, the threaded connection of said cone member and said armature being such that said cone member is adapted to advance on its thread into axial engagement with the output means;
   electromagnetic means for actuating said friction device, said means producing an axial engaging force for attracting said armature when energized; and
   means for braking said output means when said electromagnetic means is de-energized, said braking means being operatively integral with said torque transmitting means.

2. An electromagnetic clutch apparatus for torque transmission comprising:
   an input shaft;
   driving means rotatably mounted in axially fixed position to said input shaft, said driving means having a frustro-conical friction face tapering radially inward and a flat annular pole face disposed normally to the axis of said input shaft;
   clutch actuating means mounted adjacent to said driving means, said actuating means including an electromagnetic winding;
   output means;
   an armature drivenly connected to said output means, said armature being axially movable along said input shaft toward and away from said pole face of said driving means in response to said clutch actuating means, said armature having an outer cylindrical threaded surface;
   a driven friction member having an inner cylindrical threaded surface adapted to threadably engage the outer surface of said armature, said friction member having a frustro-conical face for frictionally engaging the frustro-conical face of said driving means;
   a resilient torque transmitting member rotatively connecting said driven friction member to said output means, said member adapted to flex axially upon energization and de-energization of said actuating means; and
   means for braking said output means when said actuating means is de-energized, said braking means being operatively integral with said resilient torque transmitting member;
   whereby said actuating means produces a circuitous flux path when energized which flux path passes through said pole face and said armature, moving said armature into contactive engagement with said pole face thereby imparting rotational momentum to said armature, said armature being threadably related to said driven friction member such that upon engagement of said armature and said pole face said driven friction member advances on said threads of said armature thereby engaging the mating frustro-conical friction surface of said driving member until nearly all the torque transmitted between the input and output is carried by said mating frictional surfaces.

3. In combination with an electromagnetic clutch of the type wherein torque is transmitted from an input means to an output means upon energization of an electromagnetic coil means and wherein the armature is disposed normally to the clutch axis for engagement with a magnetic pole face, the improvement which comprises:
   an annular frustro-conically shaped nonmagnetic friction member advanceably threaded to said armature for driving said output means when said electromagnetic coil means is energized;
   resilient torque transmitting means fixedly interconnecting said friction member to said output means for imparting rotational motion to said output means; and
   means for braking said output means when said electromagnetic coil means is de-energized, said braking means being operatively integral with said resilient torque transmitting means whereby the electromagnetic engaging force is axial through said armature, and the primary torque transferring surface is the frustro-conical surface of said friction member therefore maintaining close contact between said armature and said pole face while simultaneously allowing said friction member to self-adjust for wear.

4. The combination as recited in claim 3 including further means for retarding said friction member from reversing its direction of rotation relative to said armature.

5. The combination as claimed in claim 3 wherein said friction member is composed of an organic friction material.

6. The combination as claimed in claim 3 wherein said means for braking said output means comprises an annular friction brake member mounted to said nonmagnetic friction member and operative to apply a braking action to said output means under the influence of said resilient torque transmitting member; and a rotatively fixed frame member for reacting against said brake member when said brake member is biased into contact with said frame member upon de-energization of said coil means.

* * * * *